United States Patent [19]

Case

[11] 4,201,240
[45] May 6, 1980

[54] ELECTRONIC LIQUID LEVEL MONITOR AND CONTROLLER

[75] Inventor: Richard P. Case, Webster City, Iowa

[73] Assignee: White Consolidated Industries, Inc., Cleveland, Ohio

[21] Appl. No.: 927,156

[22] Filed: Jul. 21, 1978

[51] Int. Cl.² ............................................. F16K 21/16
[52] U.S. Cl. ....................................... 137/392; 68/207; 73/301; 137/387; 340/618
[58] Field of Search ............. 68/12 R, 207; 73/290 R, 73/301, 313; 137/386, 387, 392; 324/59, 61 R; 340/618, 624, 626; 364/509

[56] References Cited

U.S. PATENT DOCUMENTS

| | | | |
|---|---|---|---|
| 2,903,678 | 9/1959 | Willis | 73/313 |
| 3,190,118 | 6/1965 | Neycr | 73/290 R |
| 3,397,715 | 8/1968 | Fathauer | 137/387 |
| 3,401,562 | 9/1968 | Reaney | 73/301 |
| 3,444,882 | 5/1969 | Deaton | 137/392 |
| 3,478,373 | 11/1969 | McBride et al. | 137/387 |
| 3,497,884 | 3/1970 | Tichy et al. | 137/387 |
| 3,916,926 | 11/1975 | Smolin | 137/392 |
| 3,983,549 | 9/1976 | Akita et al. | 340/618 |
| 4,006,637 | 2/1977 | Kinosita | 73/313 |
| 4,080,828 | 3/1978 | Akita et al. | 340/624 |
| 4,084,237 | 4/1978 | Beachem et al. | 364/120 |

*Primary Examiner*—Irwin C. Cohen
*Assistant Examiner*—G. L. Walton
*Attorney, Agent, or Firm*—Pearne, Gordon, Sessions, McCoy & Granger

[57] ABSTRACT

The cycles of an oscillator varying in frequency in proportion to the changing level of a monitored liquid are counted over a fixed period of time. A derived submultiple of the count is compared relative to an electronically stored table of numbers indicative of known liquid levels. Predetermined relationships between the count and the table initiate control functions for maintaining or varying the level of monitored liquid during a programmed series of operations such as, for example, the programmed cycles of a microcomputer controlled clothes washing machine.

9 Claims, 1 Drawing Figure

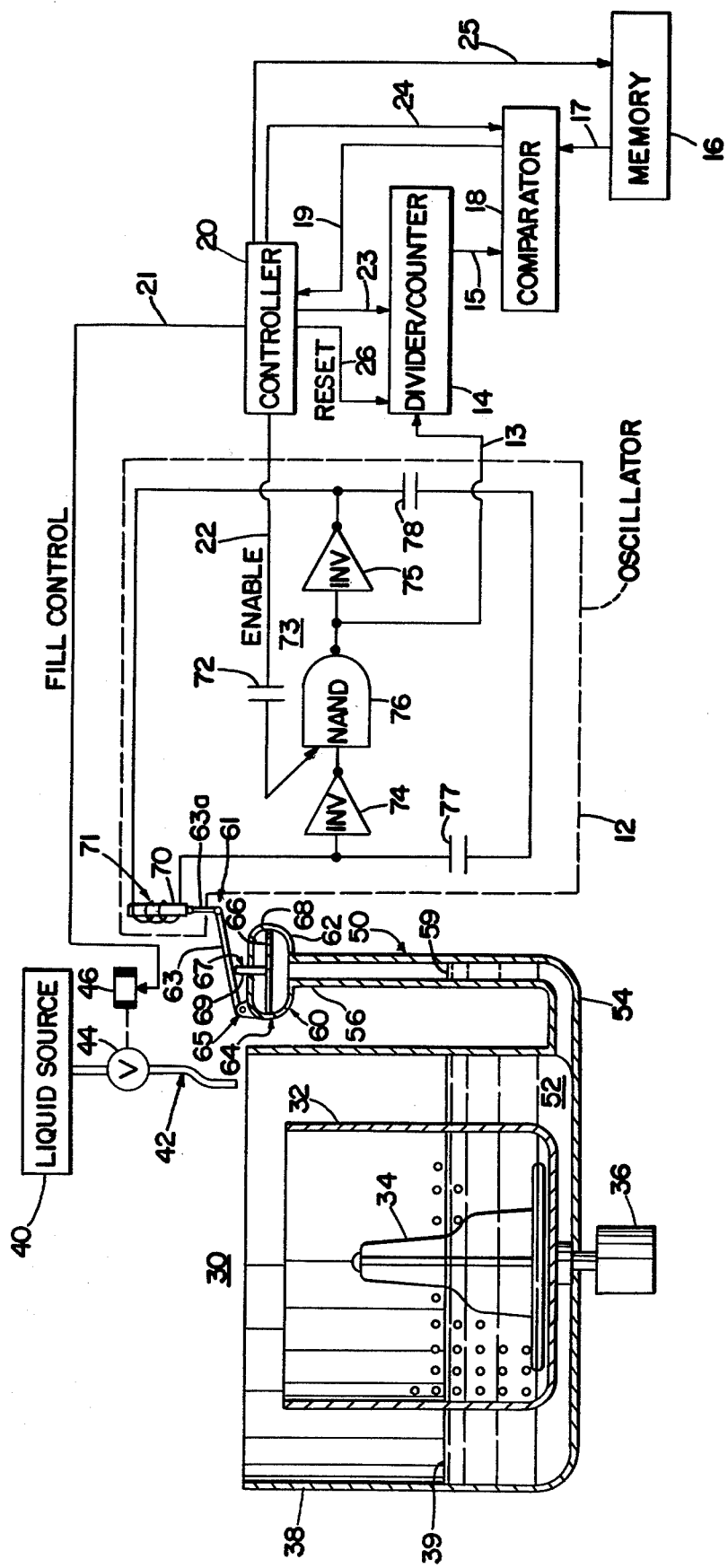

ELECTRONIC LIQUID LEVEL MONITOR AND CONTROLLER

BACKGROUND OF THE INVENTION

The present invention relates in general to liquid level monitors and controllers, and in particular to an electronic liquid level monitor and control assembly compatible for integration into, for example, a digital microcomputer system which controls a multiple-cycle clothes washing machine.

The continued utilization of microcomputer control systems in place of conventional electromechanical control systems has necessitated a concurrent development of input/output hardware which is compatible with the newly adopted microcomputer systems.

For example, the successful adaptation of a microcomputer control system to a clothes washing machine required that the transducer or transducers monitoring the water level in the washtub provide a compatible digital input to the associated microcomputer control system.

U.S. Pat. No. 4,084,237 to Beachem et al discloses a microcomputer control system for a clothes washing machine wherein the washtub water level is monitored by two transducer-like ON-OFF fluid pressure switches. While such switches inherently provide the necessary digital input characteristics compatible with a microcomputer system, they are disadvantageous in that a switch must be provided for each level of washtub water desired to be monitored and controlled via the microcomputer system. Thus, the controlled level of washtub water as taught by Beachem et al is limited to only two levels, that is, a high water level and a low water level.

It has been recognized that a single transducer washtub water level monitor and controller providing a quantitative analog-type measurement of water level in a digital format would provide greater wash cycle program flexibility as opposed to the qualitative ON-OFF liquid level indications noted previously with regard to Beachem et al. For example, four increasing water levels for use with small, medium, normal, and extra large wash loads could be provided for without the necessity of four separate ON-OFF fluid pressure switches.

The provision of such an analog-to-digital type liquid level monitor for use with a microcomputer controlled clothes washing machine must meet stringent cost and reliability requirements necessitated by the highly competitive appliance business.

SUMMARY OF THE INVENTION

The present invention provides a low cost and highly reliable electronic liquid level monitor and controller having a digital signal indicative of changes in the impedance of a passive circit component. The movement of the liquid level is mechanically tracked by a moving element associated with the passive circuit component, and the moving of the element alters proportionally the impedance of the component. The digital signal indicative of the impedance of the passive circuit component over a fixed period of time is compared to a table of predetermined number values correlated to known liquid levels. A control signal is provided when the digital signal is in a predetermined relationship with the table values, and the control signal is utilized, for example, to energize or deenergize a valved conduit providing water to the washtub of a clothes washing machine in which the level of the water in the tub is monitored and controlled.

The illustrated embodiment of the invention includes an oscillator circuit, the frequency of which is dependent upon the impedance value of an inductor coil which forms a part of the oscillator circuit. A movable ferrite core within the inductor coil mechanically tracks the level of the monitored liquid wherein the frequency of the oscillator changes in proportion to changes in the monitored liquid level. Over a fixed period of time the cycles of the oscillator are counted. The count is compared to an electronically stored table of numbers indicative of predetermined liquid level. When the count approximately equals a preselected number from the table, a control function is initiated, such as the termination of a washing machine tub filling cycle.

These and other features of the invention will become apparent to those skilled in the art upon a detailed description of a preferred embodiment of the invention.

BRIEF DESCRIPTION OF THE DRAWING

The drawing illustrates in schematic fashion the application of the present invention for the controlling of water level in a top loading clothes washing machine.

DETAILED DESCRIPTION OF THE PREFERRED EMBODIMENT

With reference to the drawing and in accordance with the invention, there is disclosed an electronic liquid level monitor and controller system which include a variable frequency oscillator circuit 12 operable over a predetermined frequency range, a binary divider/counter 14 which functions to count the cycles or oscillations of the circuit 12 over a fixed period of time, an electronic memory 16 for storing a predetermined table of values or numbers indicative of known liquid levels, a comparator 18 for comparing the cycle counts of the divider/counter 14 relative to the table of numbers within the memory 16, and a contoller 20 which synchronizes and regulates the overall operation of the system.

The functional operation of the system will now be discussed with regard to its adaptation to the monitoring and controlling of the water level within the washtub of a top loading clothes washing machine 30 of the conventional type. It is to be noted that the present invention is clearly applicable to controlling liquid levels in environments other than that of a clothes washing machine.

The washing machine 30 includes an inner rotatable foraminous wall tub 32 containing a finned agitator 34, the inner tub 32 and agitator 34 being driven by a bidirectional transmission 36 in a conventional manner during various washing machine cycles. The agitator 34 and the inner tub 32 are positioned concentrically within an outer tub 38 which holds water supplied from a source 40 via a valved conduit 42, including a valve 44, the valve conduit 42 being opened and closed for fluid flow control in response to the actuation of the valve 44 by an associated valve controlling solenoid 46.

In accordance with the present invention, a generally vertically oriented tube member 50 extends to establish communication between the lower volume 52 of the outer washtub 38 and a flexible diapharagm containing an analog-type actuator 60. The lower end 54 of the tube member 50 is in open fluid communication with the lower volume 52 of the outer tub 38 and is adapted to receive in a known manner a measurement portion of water contained within the outer tub 38.

The upper end 54 of the tube member 50 is in open fluid communication with the internal volume of a lower cup-like housing portion 62 of the actuator 60. Extending across and closing the upper end 64 of lower housing portion 62 is a relatively thin, flexible, elastomeric diaphragm 66 of rubber or the like. The diaphragm 66 serves to hermetically close, via the lower housing portion 62, the upper end 56 of the tube member 50.

An upper cup-like housing portion 68 of the actuator 60 is geometrically inverted relative to the lower housing portion 62. The lower and upper housing portions 62, 68 are joined together, as illustrated, to contain the flexible diaphragm 66 which separates their respective interior volumes. An aperture 67, centrally disposed within the upper end of the upper housing portion 68, is provided. Extending upwardly from and abutting the approximate center of the upper surface of the flexible diaphragm 66 is a push rod member 69, the upper end of the push rod member 69 extending through the aperture 67. Extending from a pivot point 65 located in a fixed position relative to the upper housing 68 is a movable lever arm 63 which pivots about the point 65. The upper end of the push rod member 69 abuts the lower surface of a lever arm 63 at a point spaced a predetermined distance from the pivot point 65.

In operation, the valved conduit 42 is opened by the solenoid 46, wherein water is supplied from the source 40 and transmitted into and contained by the outer tub 38. As the level 39 of liquid rises in the tub 38, a corresponding level 59 of liquid rises in the tube member 50. Such rising level 59 of liquid within the tube member 50 compresses gas within the tube member 50 above the liquid level 59 and causes a corresponding upward flexing movement of the diaphragm 66, the flexing of the diaphragm 66 being in proportion to the changing liquid level 39 within the tub 38. Movement of the flexible diaphragm 66 is transferred to the pusher member 69, which in turn moves the lever arm 63 upward, the lever arm 63 moving in proportion to the changing liquid level 39 within the outer tub 38.

The distal end 61 of the lever arm 63 is pivotally connected via a mechanical link 63a to a movable element 70 to be subsequently discussed, which affects the electrical characteristics of the oscillator circuit 12 wherein analog-type movement of the element 70 varies the frequency of the oscillator circuit 12. In accordance with the invention, the frequency of the oscillator circuit 12 varies in proportion to changing liquid levels 39 within the outer tub 38.

The cycles or oscillations of the oscillator circuit 12 are fed via a transmission line 13 to the binary divider/counter 14 for a fixed period of time, for example, one second. The divider/counter 14 initially divides, by a predetermined whole number, the one second cycle count (number of oscillations per second) of the oscillator circuit 12 and then provides a measurement value or a count which is a submultiple of the number of cycles of the oscillator for one second as a function of the divisor factor. For example, if the number of oscillator cycles of a predetermined one-second period equals 40,000 (4 Khz), and the divider/counter provides a divisor of 256, then the output 15 of the divider/counter 14 would provide a binary digital format representation of 156.25. Thus, the output 15 of the divider/counter 14, indicative of a quantitative measurement value (for example 156.25) corresponding to a level of liquid within the outer tub 38 over a one-second period, is provided to the comparator 18.

The memory 16 provides to the comparator 18 via line 17 a preselected number (for example 156.25) from a table of memory-contained numbers indicative of predetermined known tub liquid levels. The comparator 18, upon sensing a predetermined relationship such as approximate equality between the divider/counter output value and the memory line value, provides a control signal 19 which initiates a control function via the controller 20. For example, the control signal 19 can be used to cause actuation of the solenoid 46 via the control line 21, the solenoid shifting the valved conduit 42 into a closed or no-flow condition to terminate a tub filling operation.

The number of liquid levels monitored and controlled is a function of the number of predetermined liquid levels stored in the memory 16 and the frequency range of the oscillator circuit 12.

The controller 20 provides synchronized operation between the oscillator circuit 12, the divider/counter 14, the comparator 18, and the memory 16 via respective control lines 22, 23, 24, 25.

It can be seen that the generally analog-like movement of the lever arm 63, which is indicative of and in proportion to the liquid level 39 within the tub 38, is converted by the oscillator 12 and the divider/counter 14 into a digital format value, for example, a binary format, compatible with a digital microcomputer control system.

The monitor and control system as described above permits great flexibility in the programming requirements of the washtub liquid level 39 for various washing cycles, as opposed to prior art methods where a number of mechanical switches determined a corresponding number of liquid levels desired to be monitored.

With particular reference to the oscillator circuits 12, there is illustrated a Colpitts-type oscillator configuration including an active element 73 comprised of series-connected, solid state logic inverters 74, 75 separated by a two-point NAND gate 76 utilized to initiate and terminate oscillating of the circuit 12. Associated with the active element 73 is an LC tank-type circuit composed of passive electrical elements or components in the form of multi-turn inductor coil 71 and two bridge-oriented capacitors 77, 78. The impedance of the inductor is directly related to the relative positioning of the movable element 70, which is illustrated as cylindrical ferrite core.

In the preferred embodiment of the invention, the inductor coil 71 is in the form of a tubelike coil having an annular cross section with the cylindrical ferrite core movable element 70 inserted therein and coaxially movable relative to the coil 71, the movement of the element 70 tracking the level 39 of the water in the outer tub 38, as heretofore explained.

Upon receiving an enabling logic signal from the controller 20 via the control line 22, which is coupled to one input of the NAND gate through a coupling capacitor 72, the oscillator 12 begins to oscillate in a well known manner at a frequency dependent upon the time constant provided by the combined electrical effect of the inductor coil 71 and the capacitors 77, 78.

The controller enables, via line 22, oscillation of the circuit 12 for a one-second period whereupon the oscillations or cycles over the one-second period are detected and transferred via transmission line 13 to the divider/counter 14 which has previously been reset to zero by a reset line 26. Although the division function is not required, it has been found convenient from a programming standpoint to divide the cycles of the oscillator by, for example, 256 and to count each 256 oscillations as a unit, these units in turn being counted to provide a measurement value or number to the comparator 18 via output signal line 15, as previously explained. In practice, cascade-connected 8-bit binary counters of a conventional type have been found suitable wherein the oscillator output 13 is fed to a first 8-bit counter having its $2^8$ output pin tied to the input of the second 8-bit counter, which provides at its output a binary representation of the one-second measurement value indicative of the hertz frequency of the oscillator circuit 12.

The memory 16 is preprogrammed to contain a table of numbers indicative of predetermined water levels. For example, the memory could contain four binary represented numbers indicative of, for example, tub water levels for an extra large wash load requiring maximum tub water and normal, medium, and small wash loads requiring correspondingly decreasing amounts of water.

The following table illustrates an example of values in accordance with the present invention utilizing a predetermined oscillator frequency range of 24 to 40 Khz over the designed travel range of the ferrite core moving element 70.

| Load Size | Desired Tub Water Level | Preprogrammed Memory Numbers | Oscillator Frequency | Divider/ Counter Output Values |
|---|---|---|---|---|
| Small | 5.7" | 140 | 35.840 Khz | 140 |
| Medium | 8.7" | 120 | 30.720 Khz | 120 |
| Large | 11.7" | 107 | 27.392 Khz | 107 |
| Extra Large | 14.7" | 96 | 24.576 Khz | 96 |

It can be seen from the above table that as the water level 39 rises in the tub 38, the frequency of the oscillator circuit 12 decreases. If, for example, the user selects an extra large load size setting, the controller 20 initiates transfer of the memory-contained table number 96 to the comparator 18. When the one second sample period measurement output 15 of the divider/counter 14 equals or approximately equals 96, filling of the tub is terminated, as previously noted with regard to control signals 19 and 21. In practice, a one-second sample period taken every five seconds has been found adequate from a control standpoint.

Conversely, it is to be noted that increasing water level could be used to cause proportional increases in the frequency of the oscillator and that such an arrangement of oscillator components is clearly within the scope of the invention.

In practice, the controller 20 and comparator 18 are, for example, an integral part of a single microprocessor integrated circuit chip with the memory being an integrated circuit single chip of the read-only type (ROM). It is further contemplated that the controller 20, divider/counter 14, comparator 18, and memory 16 could each be an integral part of a single microcomputer integrated circuit chip.

The following components have been found suitable for application in the preferred embodiments:

| Component | Identification |
|---|---|
| Inverters 74,75 | CD4069 - RCA |
| NAND Gate 76 | CD4011 - RCA |
| Capacitors 72,77,78 | .004 mf |
| Inductor | 6353 Focus Coil - J.W. Miller Co. |
| Divider/Counter 14 | CD4040 - RCA |
| Memory 16 | 2716 PROM - INTEL |
| Comparator and Controller 18,20 | 8085 Microprocessor - INTEL |

Although a preferred embodiment of this invention is illustrated, it is to be understood that various modifications and rearrangements mnay be resorted to without departing from the scope of the invention disclosed and claimed.

What is claimed is:

1. An electronic liquid level monitor and controller comprising:
   a circuit including a passive component;
   an element associated with the passive component and movable relative thereto, the movement of the element relative to the passive component varying the impedance value of the passive component;
   mechanical linking means for moving the element relative to the passive component in proportion to a varying liquid level to be monitored;
   means for generating a measured value in a digital format in proportion to the impedance value of the passive component;
   means for storing at least one predetermined digital format value indicative of a known level of said liquid level to be monitored;
   means for comparing the measured value to the predetermined value; and
   means for providing a control signal when said measured value and said predetermined value, upon being compared, are in a predetermined relationship, the control signal being utilized to regulate the level of the liquid.

2. An electronic monitor according to claim 1, wherein said signal is provided when said measured value and said predetermined value for approximately equal.

3. An electronic monitor according to claim 1, wherein said measured value and said predetermined value, upon being compared, are in a binary number format.

4. An electronic liquid level monitor and control comprising:
   an oscillator circuit operable over a predetermined frequency range, the circuit including an inductor, the operating frequency of the circuit being dependent upon the impedance value of the inductor;
   an element associated with the inductor and movable relative thereto, the movement of the element relative to the inductor varying the impedance value of the inductor wherein the frequency of the oscillator circuit correspondingly varies over the predetermined frequency range;
   mechanical linking means for moving said element relative to said inductor in proportion to a varying liquid level to be monitored, said element tracking the movement of said liquid level;
   means for counting the cycles of the oscillator over a period of time to provide a digital format measurement number;

means for storing at least one predetermined digital format number indicative of a known level of said liquid to be monitored;

means for comparing the measurement number to the predetermined number; and means for providing a control signal when said measurement number and said predetermined number, upon being compared, are in a predetermined relationship, the control signal being utilized to regulate the level of the liquid.

5. An electronic monitor according to claim 4, wherein the inductor is an annular coil and wherein the element is a ferrite core, the coil and the core being coaxial.

6. An electronic monitor according to claim 4, wherein the mechanical linking means includes a generally vertically extending tube having one end adapted for communication with the liquid whose level is to be monitored, and having the other end closed by a flexible diaphragm, the diaphragm moving in response to varying pressure within the tube caused by a moving liquid column therein, the level of the liquid column being proportional to the level of the liquid to be monitored, the ferrite core being connected to and movable with the diaphragm in proportion to the movement of the liquid level.

7. An electronic monitor according to claim 4, wherein said inductor is part of a resonant circuit.

8. An electronic liquid level monitor according to claim 4, wherein said signal is utilized to control the opening and closing of a valved conduit which supplies the liquid, the level of which is monitored.

9. An electronic liquid level monitor comprising:
a resonant circuit containing oscillator operable over a predetermined frequency range, the resonant circuit including a tubelike inductor coil having an annular cross section and a cylindrical ferrite core movable within the tubelike inductor coil, the coil and the core being generally coaxial, the impedance of the coil over the predetermined frequency range varying in response to movement of the ferrite core, the frequency of the oscillator varying in response to movement of the ferrite core;

a flexible diaphragm connected to the ferrite core, the core moving in proportion to movement of the flexible diaphragm;

a vertically extending tube having its upper end closed by said diaphragm and its lower end being open and adapted for communication with a liquid the level of which is to be monitored, wherein the rising of the liquid level to be monitored causes a proportional rising of the level of a column of like liquid within said tube, the column of like liquid within the tube compressing gas within said tube between said diaphragm and the level of said column of liquid, said diaphragm moving in response to the changing pressure of said compressed gas, the movement of said diaphragm being proportional to the vertical movement of the liquid level to be monitored;

a digital counter for determining the number of cycles of said resonant circuit over a fixed period of time, the counter providing a binary number indicative of the number of oscillations of said resonant circuit over said fixed period of time;

electronic memory means for storing at least one binary number indicative of a known level of the liquid level to be monitored;

means for comparing said binary number indicative of the cycles counted with said binary number indicative of a known level of liquid, the means for comparing providing a control signal when said binary numbers are approximately equal; and valved conduit means supplying said liquid, the level of which is being monitored, said valved conduit being actuated to a closed position in response to said output signal wherein the supply of the liquid is interrupted or initiated.

* * * * *

UNITED STATES PATENT AND TRADEMARK OFFICE
CERTIFICATE OF CORRECTION

PATENT NO. : 4,201,240
DATED : May 6, 1980
INVENTOR(S) : Richard P. Case

It is certified that error appears in the above—identified patent and that said Letters Patent is hereby corrected as shown below:

Column 4, Line 42 - "two-point" should read -- two-input -- .

Column 6, Line 43, No. 2 in the Claims - "for" should read -- are -- .

Signed and Sealed this

Twenty-eighth Day of October 1980

[SEAL]

Attest:

SIDNEY A. DIAMOND

Attesting Officer

Commissioner of Patents and Trademarks